United States Patent [19]
Guthrie et al.

[11] Patent Number: 5,009,968
[45] Date of Patent: Apr. 23, 1991

[54] FUEL CELL END PLATE STRUCTURE

[75] Inventors: Robin J. Guthrie, East Hartford; Murray Katz, Newington; Craig R. Schroll, Glastonbury, all of Conn.

[73] Assignee: International Fuel Cells Corporation, South Windsor, Conn.

[21] Appl. No.: 405,251

[22] Filed: Sep. 8, 1989

[51] Int. Cl.$^5$ .................. H01M 8/02; H01M 8/24
[52] U.S. Cl. ................................ 429/26; 429/35
[58] Field of Search ............... 429/34, 35, 36, 37, 429/38, 39, 26

[56] References Cited
U.S. PATENT DOCUMENTS

| | | | |
|---|---|---|---|
| 3,442,714 | 5/1969 | Matsuno | 429/35 |
| 3,779,811 | 12/1973 | Bushnell et al. | 429/26 |
| 4,719,157 | 1/1988 | Tsutsumi et al. | 429/34 |

Primary Examiner—Donald L. Walton
Attorney, Agent, or Firm—Edward L. Kochey, Jr.

[57] ABSTRACT

The end plates (16) of a fuel cell stack (12) are formed of a thin membrane. Pressure plates (20) exert compressive load through insulation layers (22, 26) to the membrane. Electrical contact between the end plates (16) and electrodes (50, 58) is maintained without deleterious making and breaking of electrical contacts during thermal transients. The thin end plate (16) under compressive load will not distort with a temperature difference across its thickness. Pressure plate (20) experiences a low thermal transient because it is insulated from the cell. The impact on the end plate of any slight deflection created in the pressure plate by temperature difference is minimized by the resilient pressure pad, in the form of insulation, therebetween.

14 Claims, 3 Drawing Sheets

FUEL CELL END PLATE STRUCTURE

DESCRIPTION

1. Technical Field

The invention relates to compressive loading of fuel cells and in particular to loading of a high temperature fuel cell which experiences temperature transients.

2. Background of the Invention

Fuel cells conventionally comprise an anode electrode spaced apart from a cathode electrode by an electrolyte disposed within a porous matrix in the space between the two electrodes. Each electrode includes a catalyst layer on the electrolyte side. On the nonelectrolyte side of the anode electrode is a reactant gas passage for carrying a fuel, while on the nonelectrolyte side of the cathode electrode is a reactant gas passage for carrying an oxidant. The electrodes are constructed so that the reactant gas diffuses therethrough and comes into contact with the electrolyte in the catalyst layer. This causes an electrochemical reaction whereby the electrons travel from one electrode to the other through an external circuit.

In a fuel cell stack a plurality of fuel cells are connected electrically in series through electrically conducting gas impervious plates separating adjacent cells. These separator plates in combination with the adjacent electrode define the reactant gas passages.

An axial loading system in a direction perpendicular to the planes of the cells is used to ensure adequate sealing and good electrical and thermal conductivity between adjacent cells and components. The cells are conventionally compressed between a pair of end plates using tie bolts to interconnect the end plates and urge them toward one another. Any desired compressive force can be applied to the stack by suitably tightening the tie bolts.

The problem associated with maintaining an appropriate compressive load on a stack of fuel cells during operation has long been recognized. The thermal expansion characteristics of the stack and the creep characteristics of conventional cell components provide a complex internal load distribution while the force applying means may expand different amounts and at different rates. With high temperature fuel cells considerable attention has been given to various methods of applying an appropriate axial loading system. The attention, however, has been given to the application of an appropriate force throughout the operating cycle with the force being applied by a rigid plate at each end of the stack.

Molten carbonate fuel cell stacks represent a known form of high temperature fuel cell stack. A major problem has been noted in these stacks with end cell electrical resistance. The previous molten carbonate stack designs have used thick solid end plates with pressure plates and heaters located directly inside the insulation. The large increases in end cell electrical resistances occur, and are often unrecoverable, after the stacks are operated through their various temperature cycles, particularly associated with startup and shutdown. During the temperature cycles temperature gradients arise between the two opposite surfaces of the pressure plates or end plates with these temperature gradients causing the pressure or end plates to deform. This results in a nonuniform application of the force across the area of a fuel cell which permits loss of electrical contact at various locations in the end cells of the stack. As these electrical connections break lose, even a minute amount, they do not appropriately recover the electrical conductivity of the interface even though the forces may be returned to their original distribution.

SUMMARY OF THE INVENTION

It is an object of the invention to maintain substantially uniform loading across the plane of the fuel cells during normal operation and transients despite various thermal distortions of the pressure plate and to avoid thermal distortion of the end plate.

A large number of high temperature fuel cells are stacked and put under compression along an axis perpendicular to the planes of the cells. An electrically conducting flexible end plate membrane is located at each end of the stack. Each end plate membrane is in electrical contact with a corresponding electrode at multiple spaced locations along the plane of the fuel cell. A rigid pressure plate is spaced from the planar surface with a pressure pad in the form of semi-rigid insulation located between the pressure plate and the end plate membrane. The pressure pad at each end of the fuel cell stack has a substantially planar surface in contact with and compressively urged against the membrane.

The membrane is sufficiently thin that the compressive force maintains the membrane in intimate electrical contact with the electrodes.

The semi-rigid insulation is sufficiently resilient to maintain a substantially uniform force through the membrane as it flexes to absorb differential expansion within the fuel cells themselves, for instance where the center of the cell may be hotter than the outer edge and expand slightly more.

The pressure plate is insulated and remote from the fuel cells themselves so that the pressure plate does not experience rapid thermal transients resulting in distortion of the pressure plate, which in the prior art could cause uneven loading on the fuel cell.

Additionally, electric heaters may be interposed in the insulation between the membrane and the pressure plate to form a thermal guard which keeps the end cells at the required cell operating temperatures. The insulation between the heaters and the pressure plate precludes high heat rates into the end plates which would cause them to distort excessively during heat up and cool down cycles.

The membrane may also include an integral box-like structure providing sealing surfaces for fuel and air manifolds as well as appropriate reinforcement to accept the resulting loads. This box-like structure may also be used for electric power bus connections.

DESCRIPTION OF THE PREFERRED EMBODIMENT

Figure 1:
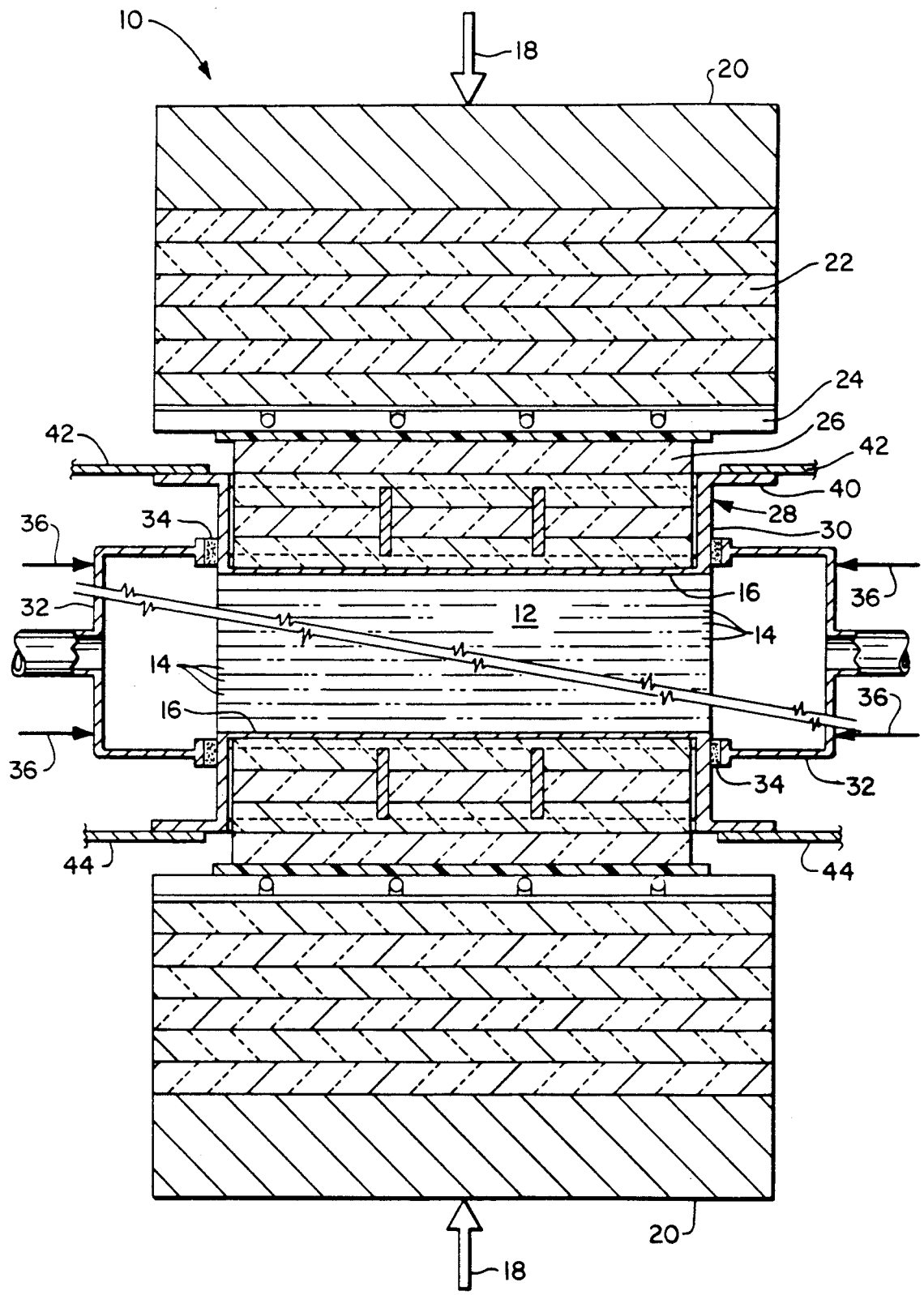
FIG. 1 is a sectional elevation of a fuel cell stack assembly.

FIG. 1 shows a fuel cell assembly 10 including a fuel cell stack 12 formed of a plurality of fuel cells 14. One hundred or more of these cells may be stacked to form a fuel cell stack 10 feet (3 meters) high. Each fuel cell is 3 feet (90 cm) long on each linear edge.

The end plate of each outer fuel cell is formed of a thin membrane 16 which is 0.125 inches (0.3175 cm) thick. Compressive load 18 is applied from both ends of the fuel cell assembly in the conventional prior art manner. These fuel cells are molten carbonate cells operating at a temperature of 1100 to 1300 F. (590° C. to 700° C.).

Rigid pressure plates 20 at each end spread the load substantially uniformly against the first portion 22 of the layers of semi-rigid thermal insulation. This insulation is preferably calcium silicate with inert fillers and reinforcing agents. While this type insulation is generally known in the art as rigid insulation, the term semi-rigid insulation is used here since it better defines the characteristics utilized. It is the purpose of this insulation to not only insulate, but to compressively transmit load and to resiliently apply the load to the end plate membrane.

An electric heater 24 is interposed between the first portion 22 of the insulation and the second portion 26 of the insulation. It can be seen that at both ends of the fuel cell stack the compressive load is passed through the insulating and compressive force transmitting means in the form of semi-rigid insulation against the thin membrane 26.

Integral with each end plate membrane is a box-like wall structure 28 each having four walls 30. The gas manifolds 32 are forced into sealing contact with these walls with seals 34 being held in contact by loading forces 36 from a loading structure (not shown).

An outwardly extending flange 40 is integral with each of the walls, this serving to reinforce the walls and maintain them sufficiently rigid for appropriate sealing contact with the manifold. This reinforcing member also serves as an attachment portion for electric power buses 42 and 44.

Figure 2:
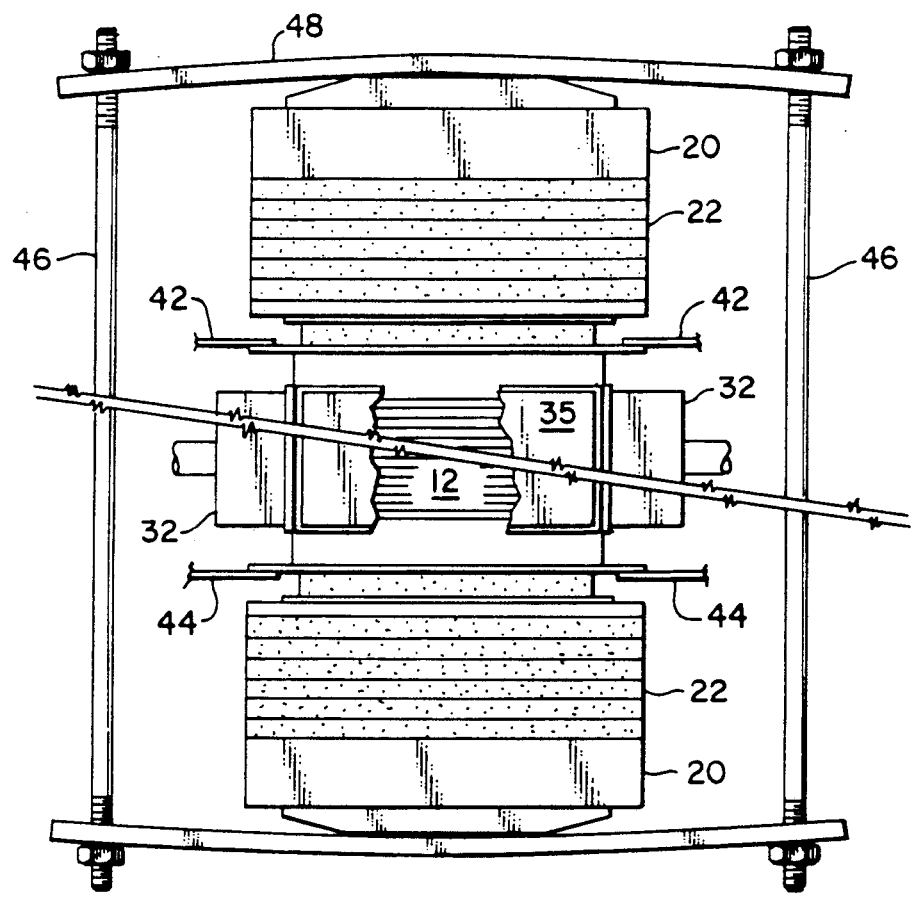
FIG. 2 is an elevation of a fuel cell stack assembly with a method of applying axial load shown.

FIG. 2 shows the fuel manifolds 32, the air manifold 35, and illustrates the method of applying compressive load 18. Tie rods 46 are connected to leaf spring 48 whereby they continually apply a compressive load, but with the design being such that the variations of the applied load are within an acceptable range despite the expansion of the fuel cell stack and/or the tie rods. It is understood that any of the conventional means of applying load may be used, the invention here relating to the distribution of load across the cells rather than the method of applying the overall load.

Figure 3:
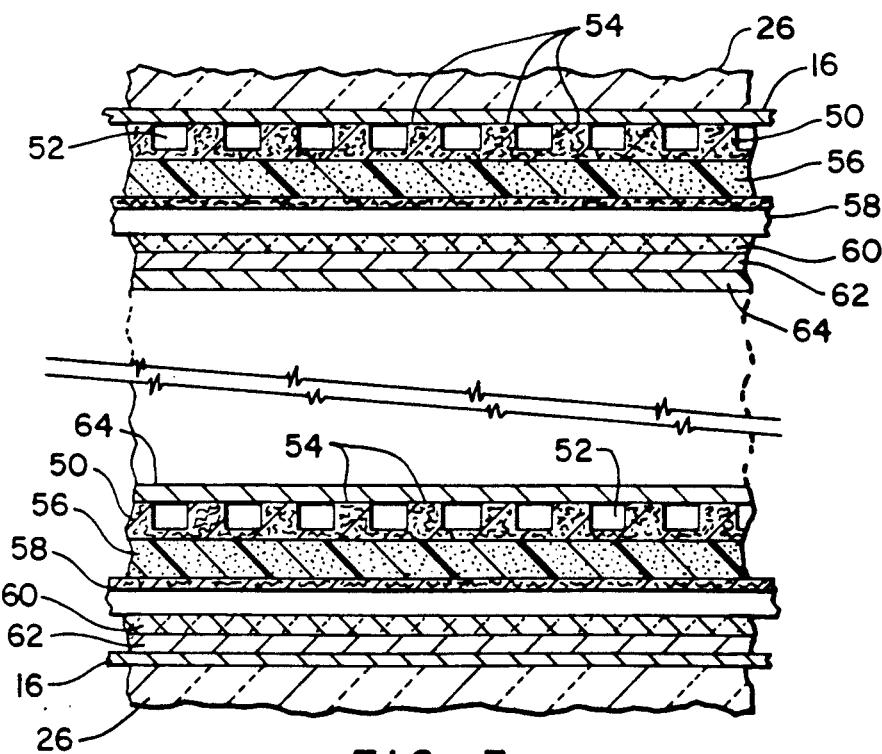
FIG. 3 is a section through a portion of a fuel cell stack at the two ends.

FIG. 3 shows the details of the top and bottom fuel cells. Semi-rigid insulation 26 is seen abutting membrane 16 at both ends of the fuel stack. An anode 50 has flow passages 52 therethrough and is in electrical contact with membrane 16 at a multiplicity of spaced locations 54.

Electrolyte matrix 56 is interposed between the anode 50 and cathode 58. Perforated electrically conducting plate 60 abuts the cathode with an open spaced current collector 62 conducting electrical current to separator plate 64 and permitting gas passage between the collector plate and the cathode. At the lower end of the stack there is also shown the separator plate 64, anode 50 and matrix 56. The cathode 58 is electrically connected to the lower membrane 16 through the perforated plate 60 and the current collector 62.

It can be seen that the electric current must flow through multiple mechanical connections between the cathode, the perforated plate, the current collector, the separator plate, and the anode. It is these mechanical connections which cause an increase in the electrical resistance if they are broken and remade during operation. Therefore, in accordance with this invention uniform pressure is applied by the compressive load to maintain these connections and intimate electrical contact at all times.

During operation of the fuel cells rapid temperature transients, for instance from 1300 F. (700° C.) to 1100 F. (590° C.) may occur quite rapidly. These transients at high temperature occur in following electric power load demand, and therefore cannot reasonably be slowed down. During start up the transient occurs from room temperature. While a long startup period can be used, it is undesirable to have a requirement which delays startup. Also, at the lower temperatures the electrolyte may not yet be molten. The making and breaking of electrical contact can therefore be even more damaging.

In accordance with the prior art this temperature transient being imposed upon the end plate, and possibly also the pressure plate caused the end plate to distort thereby imposing nonuniform compressive load on the fuel cell stack. Here this temperature transient is imposed only on membrane 16. This membrane will also see a temperature difference throughout its thickness. This temperature difference, however, will be less because of the thinness of the membrane, but more importantly the tendency of this plate to bow can easily be overcome because of the low bending stiffness strength of the membrane. Therefore, despite a temperature transient, the forces imposed through the semi-rigid thermal insulation continue to be uniform across the fuel cell.

It also may happen during operation that the stack of fuel cells expands differently across its width, for instance the center of the fuel cell may operate at a higher temperature than the outer edges. A rigid plate imposed against this would impose excessive force at one location and insufficient force at another location. This may permit the immediate disengagement of contact at the one section, or it may permanently distort the overly compressed section resulting in later disengagement of that portion. With the membrane backed up by the resilient semi-rigid thermal insulation, the membrane can deform in accordance with the distortion of the fuel cells so that the force remains substantially uniform across the area of the fuel cell.

Electric heaters 24 are normally operated to maintain their temperature of about 1200 F. (650° C.) at the heater location. Maintaining this average stack operating temperature forms a thermal guard which keeps the end cells at the required cell operating temperature. It is understood that other types of heaters may be used such as a plate fin heat exchanger with hot gas flowing through it. These heaters are further insulated so as to avoid high rates of heat flow into the end plate which would cause the end plates to distort excessively during heat up and cool down cycles. It is noted that while distortion of the pressure plate is undesirable even at this remote location, distortion can be tolerated because of the force evening effect of the multiple layers of semi-rigid insulation before the force is imposed on the membrane.

With a fuel cell stack of 3 (90 cm) feet on each linear edge, a convenient thickness of membrane is ⅛ inch (0.3175 cm). This membrane should be thin enough to uniformly pass the pressure loading, but must be sufficiently thick to conduct the electric current without excessive voltage loss. For fuel cells of the linear dimension on each edge other than 36 inches (90 cm) some modification of the thickness of the membrane is appropriate.

Functionally, in accordance with the invention, the thinner the end plate the better. A minimum thickness of 10 mils (0.25 mm) is generally required for corrosion resistance. Some increased thickness facilitates handling during manufacture. Substantial thickness of the end plate is, however, the cause of the problem to be overcome. The membrane must be sufficiently thin to be maintained flat under the compressive load during the experienced temperature differences across the thickness of the membrane. The preferred thickness is in the range of 0.03 to 1.3 cm, and more particularly between 0.2 and 1 cm.

Figure 4:
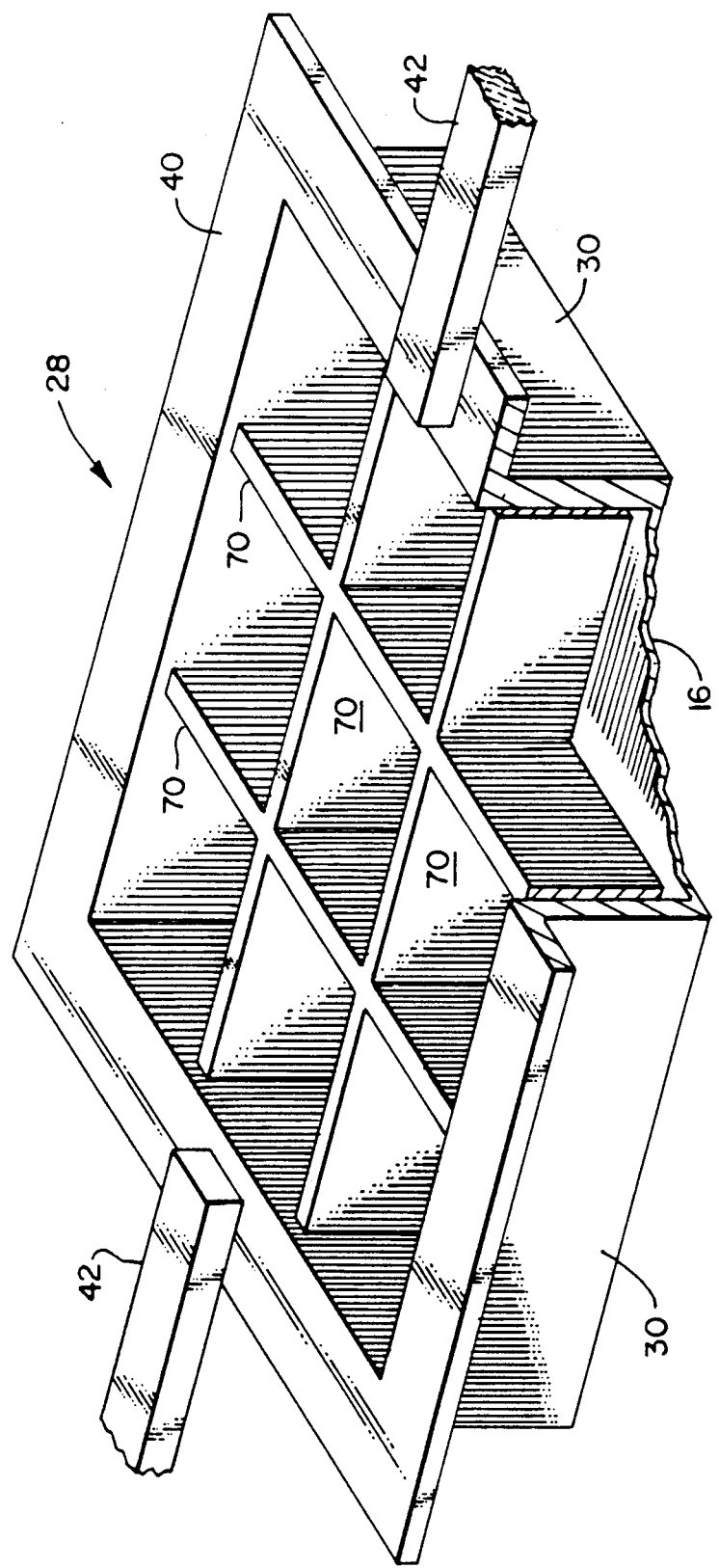
FIG. 4 is an isometric view of the membrane with the box-like structure integrally formed therewith.

FIG. 4 shows an isometric view of end plate membrane 16 which is integrally formed with box-like structure 28. Four side walls 30 extend axially of the fuel cell and form straight surfaces for attachment of the gas manifolds. While the membrane 16 is ⅛ inch (0.3175 cm) thick, the walls 30 are ¼ inch (0.64 cm) thick and the reinforcing flanges 40 are also ⅜ inch (0.95 cm) thick. The wall 30 not only provides the relatively rigid surface for the manifold but also a thicker material for the conduction of electric current to electric power bus 42. As illustrated here, a plurality of electric power buses may be used.

In order to more rigidly hold the surface 30 straight, a plurality of struts 70 are welded to the vertical walls. These struts are free of and out of contact with the membrane 16 so that they do not interfere with the desired flexibility of that membrane. The insulating and compressive force transmitting semi-rigid insulation is segmented at the elevation of the struts so that the uniform force may be transmitted between the struts and against the membrane.

We claim:
1. A fuel cell assembly comprising:
a fuel cell stack formed of a large number of fuel cells having electrodes and stacked in electrical series relationship;
an electrically conducting flexible membrane at each end of said stack, each membrane in electrical contact with an electrode at multiple spaced locations in a plane parallel to the planes of said fuel cells;
a pressure pad at each end of said fuel cell stack including a substantially planar surface in contact with the respective membrane;
compression means for exerting a compressive force on said pressure pads towards said fuel cell stack;
said membranes being sufficiently thin, that the compressive force maintains the membranes in intimate electrical contact with said electrodes at multiple locations;
each membrane integral with a box-like wall structure of a thickness greater than that of said membrane, and extending axially of said fuel cell stack at the outer periphery of said membrane; and
an electric power bus bar connected to said box-like wall structure.
2. A fuel cell assembly as in claim 1:
fuel manifolds;
air manifolds; and
each manifold sealingly abutting said box-like walls.
3. A fuel cell apparatus as in claim 2:
said fuel cells being molten carbonate fuel cells.
4. A fuel cell assembly as in claim 2:
each box-like wall having an outwardly extending reinforcing flange.
5. A fuel assembly comprising:
a fuel cell stack formed of a large number of fuel cells having electrodes and stacked in electrical series relationship;
an electrically conducting flexible membrane at each end of said stack, each membrane in electrical contact with an electrode at multiple spaced locations in a plane parallel to the planes of said fuel cells;
a pressure pad at each end of said fuel cell stack including a substantially planar surface in contact with the respective membrane;
thick pressure plates in compressive contact with said pressure pad for exerting a compressive force on said pressure pads towards said fuel cell stack;
said membranes being sufficiently thin, that the compressive force maintains the membranes in intimate electrical contact with said electrodes at multiple locations;
two heaters; and
each of said heaters interposed in said semi-rigid insulation between said membrane and said pressure plate.
6. A fuel cell apparatus as in claim 5:
said membrane between 0.2 and 1 cm thick.
7. A fuel cell assembly as in claim 5:
each membrane integral with a box-like wall structure extending axially of said fuel cell stack at the outer periphery of said membrane;
fuel manifolds;
air manifolds; and
each manifold sealingly abutting said box-like walls.
8. A fuel cell assembly as in claim 7:
each box-like wall having an outwardly extending reinforcing flange.
9. A fuel cell apparatus as in claim 8:
said membrane between 0.2 and 1 cm thick.
10. A fuel cell assembly comprising:
a fuel cell stack formed of a large number of fuel cells having electrodes and stacked in electrical series relationship;
an electrically conducting flexible membrane at each end of said stack, each membrane in electrical contact with an electrode at multiple spaced locations in a plane parallel to the planes of said fuel cells;
a pressure pad at each end of said fuel cell stack including a substantially planar surface in contact with the respective membrane;
compression means for exerting a compressive force on said pressure pads towards said fuel cell stack;
said membranes being sufficiently thin, that the compressive force maintains the membranes in intimate electrical contact with said electrodes at multiple locations;
each membrane integral with a box-like wall structure extending axially of said fuel cell stack at the outer periphery of said membrane;
fuel manifolds;
air manifolds; and
each manifold sealingly abutting said box-like walls.
11. A fuel cell assembly as in claim 10:

each box-like wall having an outwardly extending reinforcing flange.

12. A fuel cell assembly as in claim 11:

a plurality of struts connecting opposite walls of said box-like structure;

said struts free of said membrane; and said force transmitting means segmented to form parallel force transmitting paths between said struts.

13. A fuel cell apparatus as in claim 11:

an electric power bus bar connected to each box-like wall.

14. A fuel cell assembly comprising:

a fuel cell stack formed of a large number of fuel cells having electrodes and stacked in electrical series relationship;

an electrically conducting flexible membrane at each end of said stack, each membrane in electrical contact with an electrode at multiple spaced locations in a plane parallel to the planes of said fuel cells;

a pressure pad at each end of said fuel cell stack including a substantially planar surface in contact with the respective membrane;

compression means for exerting a compressive force on said pressure pads towards said fuel cell stack;

said membranes being sufficiently thin, that the compressive force maintains the membranes in intimate electrical contact with said electrodes at multiple locations;

said membrane between 0.2 1 cm thick; and said fuel cells being molten carbonate fuel cells.

* * * * *

UNITED STATES PATENT AND TRADEMARK OFFICE
CERTIFICATE OF CORRECTION

PATENT NO. : 5,009,968

DATED : April 23, 1991

INVENTOR(S) : Robin J. Guthrie et al

It is certified that error appears in the above-identified patent and that said Letters Patent is hereby corrected as shown below:

Column 8, Claim 14, line 15, after "0.2" insert --and--

Signed and Sealed this

Fifteenth Day of December, 1992

Attest:

DOUGLAS B. COMER

Attesting Officer

Acting Commissioner of Patents and Trademarks